United States Patent
Lytell (10) Patent No.: US 9,659,035 B2
(45) Date of Patent: May 23, 2017

(54) AUTHENTICATED DIGITAL PHOTOGRAPHY SYSTEM AND METHOD

(71) Applicant: James Lytell, Great Neck, NY (US)

(72) Inventor: James Lytell, Great Neck, NY (US)

( * ) Notice: Subject to any disclaimer, the term of this patent is extended or adjusted under 35 U.S.C. 154(b) by 0 days.

(21) Appl. No.: 14/230,573

(22) Filed: Mar. 31, 2014

(65) Prior Publication Data

US 2015/0278206 A1   Oct. 1, 2015

(51) Int. Cl.
| | |
|---|---|
| *G06F 17/30* | (2006.01) |
| *G06F 21/10* | (2013.01) |
| *G06F 21/64* | (2013.01) |
| *H04N 5/77* | (2006.01) |
| *H04N 5/907* | (2006.01) |
| *H04N 5/44* | (2011.01) |

(52) U.S. Cl.
CPC .......... *G06F 17/3028* (2013.01); *G06F 21/10* (2013.01); *G06F 21/64* (2013.01); *H04N 5/772* (2013.01); *H04N 5/907* (2013.01); *G06F 2221/0737* (2013.01); *H04N 5/44* (2013.01)

(58) Field of Classification Search
CPC ................ G06F 17/3028; G06F 21/10; G06F 2221/0737; H04N 5/44
See application file for complete search history.

(56) References Cited

U.S. PATENT DOCUMENTS

| | | | |
|---|---|---|---|
| 8,240,419 B2 | 8/2012 | Zimmermann et al. | |
| 2005/0273368 A1* | 12/2005 | Hutten | G06Q 40/08 705/4 |
| 2007/0073937 A1* | 3/2007 | Feinberg et al. | 710/62 |
| 2007/0291303 A1* | 12/2007 | Tanaka et al. | 358/1.15 |
| 2008/0297409 A1* | 12/2008 | Klassen et al. | 342/357.06 |
| 2010/0316264 A1* | 12/2010 | Ferren et al. | 382/117 |
| 2011/0197241 A1 | 8/2011 | Creamer et al. | |
| 2012/0229672 A1* | 9/2012 | Cok et al. | 348/231.2 |
| 2012/0278155 A1* | 11/2012 | Faith | G06Q 20/40145 705/14.26 |
| 2013/0169442 A1 | 7/2013 | Ruocco et al. | |
| 2013/0194625 A1 | 8/2013 | Inami et al. | |
| 2013/0291081 A1* | 10/2013 | Mechaley, Jr. | H04W 12/06 726/7 |

FOREIGN PATENT DOCUMENTS

WO    WO 2005/036814 A1    4/2005

OTHER PUBLICATIONS

International Search Report and Written Opinion dated Jul. 9, 2015 received from Application No. PCT/US2015/023239.

\* cited by examiner

*Primary Examiner* — Mekonnen Dagnew (74) *Attorney, Agent, or Firm* — Scully, Scott, Murphy & Presser, P.C.

(57) ABSTRACT

A system and method for maintaining authenticity of a forensic digital image is provided. The system includes a dSLR camera having a secure storage coupled to a uni-directional communication circuit configured to transmit data to a remote repository. Moreover, bi-directional control messages are transmitted from the repository to a third mobile device in the possession of the photographer.

20 Claims, 5 Drawing Sheets

AUTHENTICATED DIGITAL PHOTOGRAPHY SYSTEM AND METHOD

FIELD OF THE DISCLOSURE

The present disclosure relates generally to digital photography. More specifically, the present disclosure relates to a system and method for authenticating digital images as unaltered.

BACKGROUND OF THE DISCLOSURE

Digital images gathered from digital cameras are susceptible to alterations and modifications, making the digital images appear to display elements that were not present during the taking of the photograph. Many programs capable of alter digital images are readily available to anyone. Thus digital images can be altered at any time after initial generation.

Moreover, even if the digital image is retrieved directly from the digital camera storage, one cannot be sure that the image had not been previously overwritten by an altered version since conventional digital camera storage is designed to be bi-directionally accessible by a computer, for example.

Because digital images are so easily alterable, issues arise when authenticating digital images, such as for introduction as evidence in a criminal or civil trial. In order to show that a digital image is unaltered, a strict chain of custody must be proven, with one gap in the chain proving fatal to the introduction and acceptance of the digital image into evidence. Not only does the chain have to be shown for possession of the image from the moment of image creation until the time of introduction as evidence, it must also be shown that the file has remained unaltered for that length of time. Since the chain of custody needs to be proven for each digital image relied upon, the process can be onerous and potentially problematic if the chain of custody has even the briefest of gaps.

As a result, in many instances, film photography is also used so that the film images will be admissible into evidence. Film images are more readily admissible into evidence because film images recorded on a film negative are difficult to alter in contrast to digital photographic images. However, using both film and digital photographic image recording is both time and resource consuming.

As one example, during a typical law enforcement investigation, many digital photographs are taken of a scene, objects, etc. These digital photographs are gathered and stored on conventional digital cameras, typically on conventional storage mediums, such as CompactFlash®, or Secure Digital (SD) storage mediums. These digital images may be used by law enforcement for their own in-house procedures, while a second set of similar, nearly exact, set of film images are gathered. The digital images are typically used during the investigatory stage because they are more easily transferrable and can be enhanced and enlarged with ease. In the meantime, the set of film images is stored and will be relied upon in the future if they are needed at a trial.

To date, there is no digital image storage medium available in the marketplace that prevents alteration of digital images stored thereon. Therefore, digital images still face admissibility issues in court proceedings.

Embodiments of the present application provide methods and devices that address the above and other issues.

SUMMARY OF THE DISCLOSURE

An aspect of the present disclosure is a digital camera having an image pickup device configured to generate image data; a secure storage device configured to receive and store image data from the image pickup device; and a communication circuit operably connected to the secure storage device, the communication circuit configured to transmit the image data to a repository accessible by a pre-stored communication identifier.

Another aspect of the present disclosure is a hardware module for a digital camera. The hardware module includes a non-volatile storage device for storing a plurality of images recorded by the digital camera; an interface configured to form a data communication path between the digital camera and the non-volatile storage device; a hardware processor configured to receive image data from the digital camera by way of the interface, append identifying information to the received image data; and store the received image data on the non-volatile storage device; and a communication circuit configured to establish a data transfer path between the non-volatile storage device and a remotely located data repository.

Another aspect of the present disclosure is a method maintaining authenticity of a digital image. The method includes receiving a request from a digital imaging device to transfer digital image data to a secure repository, the request including a unique identifier of the digital imaging device; verifying the unique identifier as belonging to a registered device by comparison with entries in a database maintained by the repository; transmitting an authentication request to a photographer associated with the registered device; receiving an authentication reply from the photographer, the authentication request including a passcode; verifying the received passcode is associated with the photographer; transmit a begin-transmission message to the photographer; receive image data from the digital imaging device; and storing the received image data at a designated location in a storage system.

Another aspect of the present disclosure is a digital image recording apparatus. The digital image recording apparatus includes an image pickup device configured to generate image data; a secure storage device configured to receive and store image data from the image pickup device; and a communication circuit operably connected to the secure storage device. The communication circuit is configured to transmit the image data to a repository accessible by a pre-stored communication identifier. Moreover, the digital image recording apparatus may be a digital video recording device.

BRIEF DESCRIPTION OF THE DRAWINGS

These and other features, aspects, and advantages of the present disclosure will become better understood with regard to the following description, appended claims, and accompanying drawings wherein:

DETAILED DESCRIPTION OF DISCLOSURE

The present disclosure includes improvements over conventional digital cameras and methods of image security.

Figure 2:
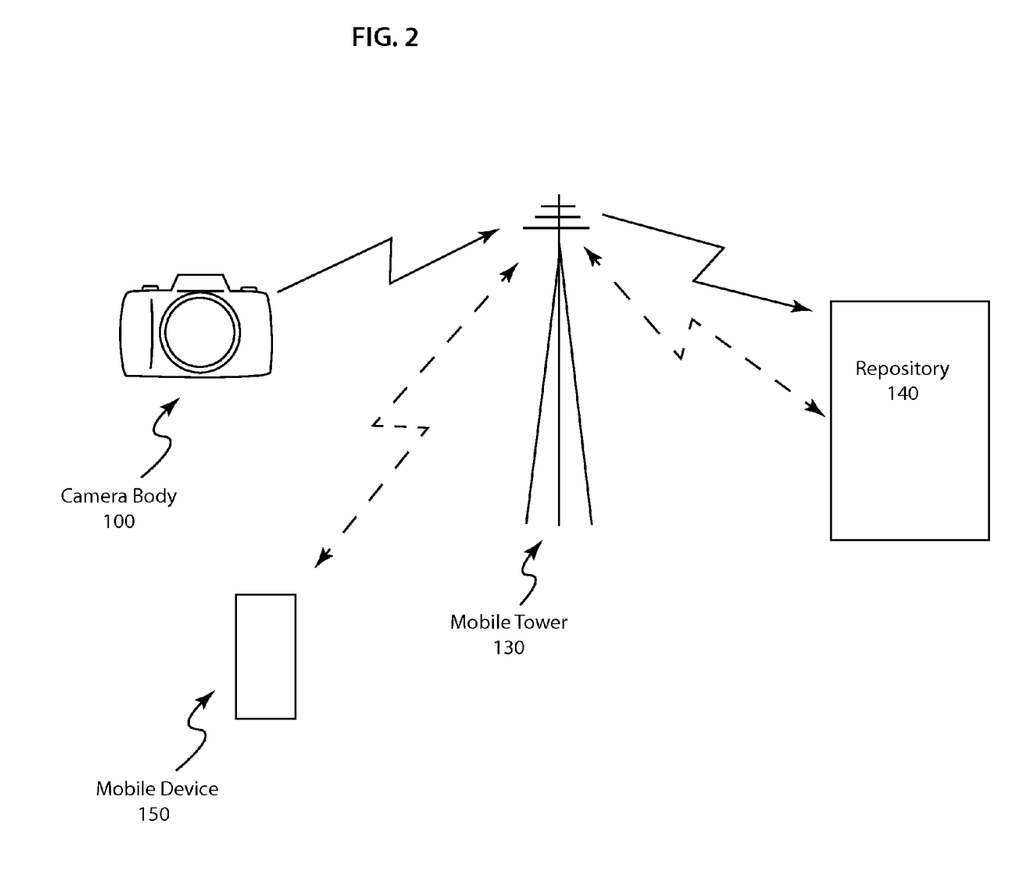
FIG. 2 is a graphical representation of the image security system in accordance with an embodiment of the present disclosure.

An embodiment of the present disclosure, as shown in FIG. 2, includes a camera body 100 capable of remote communication with a data repository 140. The communication between the camera body 100 and the data repository 140 is secured by encryption and carried over a wireless cellular communication system 130. Additionally, for added security the communication between the camera body 100 and the data repository 140 may be uni-directional—data is transmitted from the camera body 100 to the data repository 140 only.

Alternatively, the data repository 140 may be configured to return a "safe receipt" signal to the camera body 100 upon completion of a successful image transfer. In this case the camera body 100 is configured to accept a limited set of signals by way of the communication channel utilized for the image transfer. The limited set of signals include, but are not limited to, a "ready to transmit" signal informing the photographer to proceed with the transmission of images from the camera body 100 to the repository 140; a "safe receipt" signal confirming completed upload of one or more images from the camera body 100 to the repository 140; and a "transmission error" signal reporting interruption of the data upload or corruption of the data being uploaded.

Each of the above signals may provide additional information for display by the camera body 100 on a display screen (not shown). However, it is noted that the camera body 100 is not configured to receive commands via the communication channel. By limiting the receivable signals to non-command, informational data only, the data held in the camera body 100 is protected from external tampering or hacking. The above set of signals is described in greater detail below.

The "ready to transmit" signal is sent from the repository 140 to the camera body 100 upon the establishment of a communication channel therebetween. The purpose of the "ready to transmit" signal is to notify the photographer that the repository 140 is ready for the data transfer from the camera body 100 to the repository 140. Upon receipt of the "ready to transmit" signal, the photographer manually initiates the data transfer by, for example depressing a dedicated transmit button, or selecting a "transmit data" menu item.

The "safe receipt" signal provides confirmation to the photographer that the data has been received uncorrupted by the repository 140. The "safe receipt" signal is transmitted by the repository 140 to the camera body 100 immediately prior to termination of the communication channel therebetween. The "safe receipt" signal may include additional information, such as number of images received, image file names, image size, a hash value used for authentication of each image, date and time of upload, duration of upload, and camera identifier, for example. The additional information provided may be sent via email to the photographer to whom the camera body 100 is registered as well. The purpose of the additional information included with the "safe receipt" signal is to provide chain of custody and providence information. Additionally, the above information may be used to prove or disprove allegations of tampering or hacking of the image upload to the repository 140.

The "transmission error" signal provides notification to the photographer that the upload was unsuccessful. The "transmission error" signal may include information identifying the cause of the error. For example, the "transmission error" signal may identify the cause as a corrupted data, transmission timeout, weak signal, etc.

While the above signals have been described as being transmitted from the repository 140 to the camera body 100, the signals may instead be transmitted directly to a mobile device 150 of the photographer to whom the camera body 100 is registered. By transmitting the above signals to a device entirely separate and isolated from the camera body 100, a further layer of protection is provided for the data stored on the camera body 100 since the camera body 100 is not required, in such a case, to be equipped with a receiver or configured to receive data from an external source over a communication channel. Thus, in this configuration, a uni-directional communication channel is established from the camera body 100 to the repository 140 and a second, bi-directional communication channel is established between the repository 140 and a mobile device 150 of the photographer registered to the camera body 100. This configuration prevents any hacking by way of illicit transmissions to the camera body 100.

Figure 1:
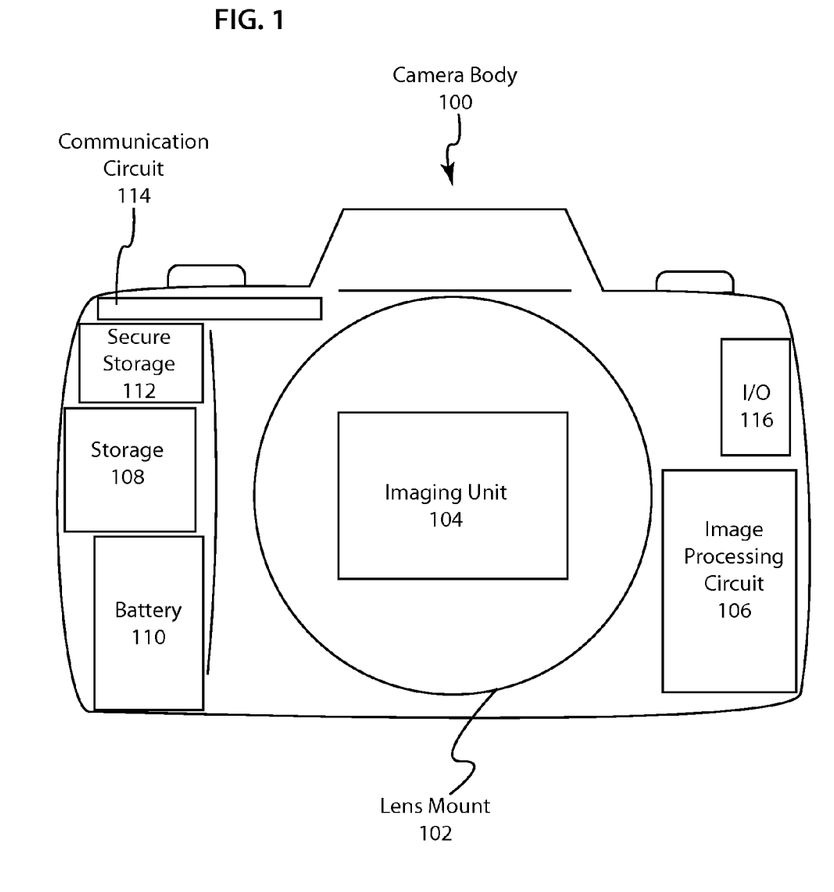
FIG. 1 is a graphical representation of a digital camera in accordance with an embodiment of the present disclosure.

Turning to FIG. 1, the structure of a camera body 100 of an embodiment of the present disclosure is shown. The camera body 100 includes a lens mount 102, an imaging unit, such as a charge coupled device (CCD) or a complementary metal-oxide-semiconductor (CMOS) image sensor, for example, and an image processing circuit 106. Additionally, the camera body 100 houses non-volatile storage 108, such as read-only memory, erasable read-only memory, flash memory, magnetic media, magneto-optical media or optical media. A battery 110 provides energizing power to the various electronic components residing in the camera body 100.

In addition to the non-volatile storage 108, the camera body 100 houses a secured storage 112, which may be disposed within the camera body 100 as a separate flash memory, magnetic media, magneto-optical media or optical media from the non-volatile storage 108. Alternatively, the secured storage 112 may be a portion of the same physical storage device as the non-volatile storage 108, embodied as separate and distinct partitions on an SD card for example. Furthermore, in an embodiment of the present disclosure, the non-volatile storage 108 may not be present. Instead, the camera body 100 only houses a secured storage 112.

For the purposes of the present disclosure, the secured storage 112 is understood to provide storage for only images intended to be secured and transmitted by way of a communication circuit 114 to a remote server for archiving, as previously described. The communication circuit 114 may communicate via a mobile data communication protocol (i.e., GSM, CDMA, TDMA, WCDMA, LTE, etc.) or wireless protocol such as IEEE 802.11. Moreover, the mobile data communication may be implemented over a satellite link. Furthermore, an embodiment of the present disclosure may include a communication circuit configured to communicate data to a remote site using multiple communication means, such as mobile cellular and satellite. In this case, the communication means utilized may be based on signal strength of the multiple communication means or may be user selectable.

The secure storage 112 may provide device level encryption or file level encryption, as well. Also, in an embodiment, the secured storage 112 may sign all data stored thereon with a unique identifier linked to the individual camera body 100 or to an individual photographer.

The non-volatile storage 108 is configured to store firmware for operating the various systems of the camera body.

An I/O interface 116 is also provided for interfacing the camera body 100 with an external monitor or computer, for example.

Regarding the functioning of the camera body of the present disclosure, in an embodiment, the firmware of the camera body 100 allows a photographer to select a "secure archiving mode" by way of a predefine button (not shown) or menu option displayed on a screen (not shown), such as a liquid crystal display (LCD), or organic light emitting diode (OLED) display, for example. Once "secure archiving mode" is selected, digital photograph images, captured by the imaging unit 104 and processed by the image processing circuit 106, are saved to the secure storage 112. As noted above, the secure storage 112 may be configured to encrypt the data stored thereon or otherwise sign the data using a public-private key scheme. Additionally, the image processing circuit 106 appends EXIF data to each image file. Such EXIF data may include global positioning system (GPS) derived coordinates of the camera body at the time of recordation of the image, date and time the image was recorded, camera identifier, photographer identifier, etc. The GPS derived coordinates may be acquired by way of a GPS receiver (not shown) housed in the camera body 100, or an add-on module (not shown) coupled to the camera body through the I/O interface 116, for example.

Figure 3:
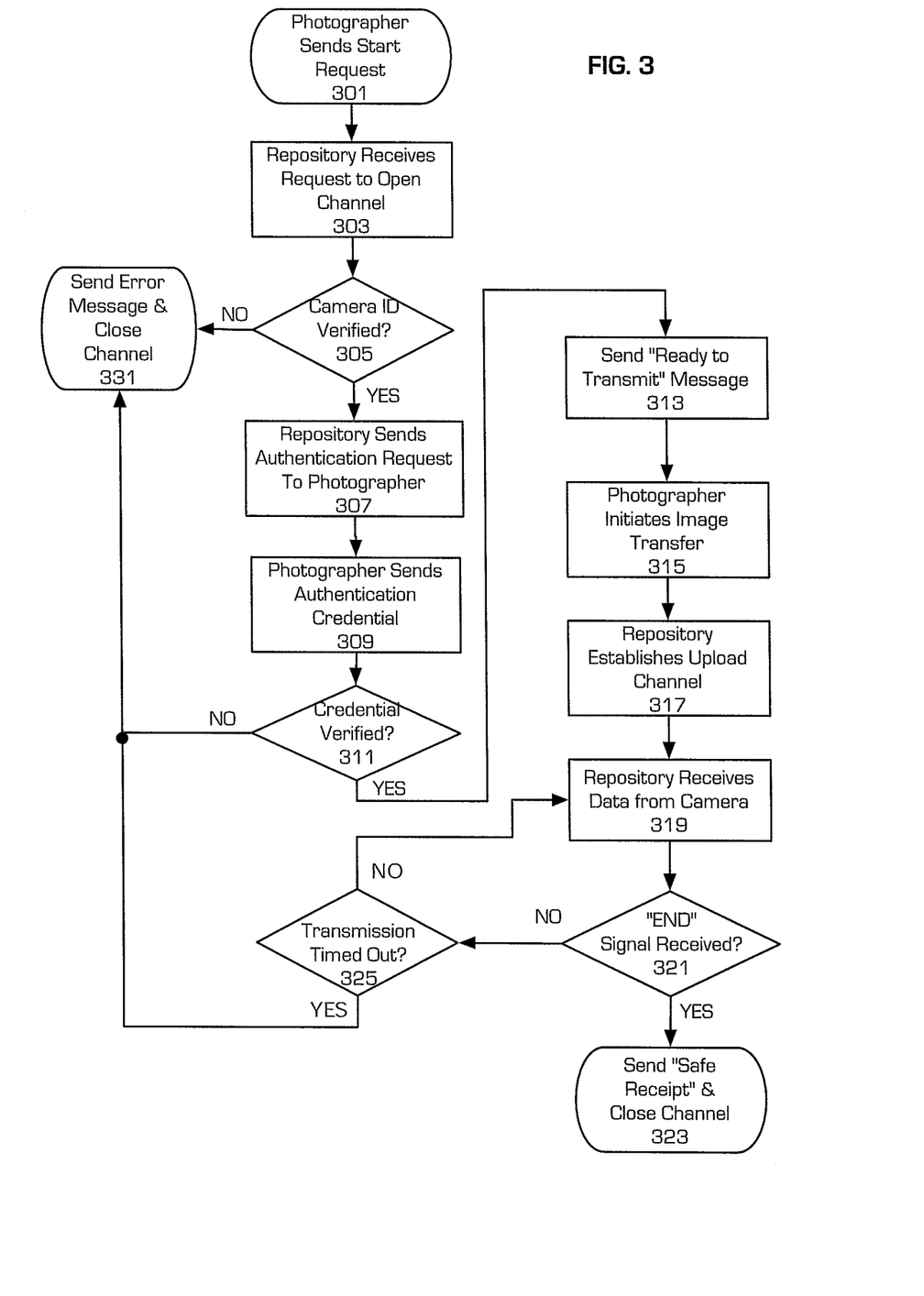
FIG. 3 is a flow diagram illustrating the processes executed by an embodiment of the present disclosure.

Upon completion of recording an incident (crime scene, insurance investigation, etc.) the photographer accesses a menu option, provided by the firmware, for initiating transfer of the stored digital photographic images to the repository 140. FIG. 3 provides a flow diagram of the process of transferring an image from the camera body 100 to the repository 140 using the communication circuit 114.

As noted above, the transfer process begins at step 301 with the photographer selecting a "transfer data" menu option, which causes the communication circuit 114 to open a channel to the repository 140. Upon receipt of a request to open a channel at step 303, the repository 140 verifies the identification of the camera body 100 by checking a camera identifier sent by the communication circuit 114 in the request against a database of registered/authorized camera bodies in step 305. A successful result (YES) from 305 causes the process to proceed to step 307, while an unsuccessful result (NO) causes the repository 140 to transmit an error signal to the camera body 100 and close the channel at step 331.

As a secondary authentication, the repository sends an authentication message to the photographer requesting an authentication credential in step 307. The authentication message may be sent to the camera body 100 by way of the channel. Alternatively, the authentication message may be sent to a mobile device 150, in the form of a text message for example, registered in the database as a contact number for the photographer associated with the camera body 100. The photographer keys in an authentication credential, such as a password or personal identification number, and transmits the authentication credential to the repository 140 using the same means as employed by the repository 140 to send the authentication message in step 309.

At step 311, the authentication credential received by the repository 140 is compared to a stored authentication credential associated with the photographer. If the result from step 311 is successful (YES), the process proceeds to step 313, while an unsuccessful result (NO) causes the process to proceed to step 331.

In step 313, the repository sends a "ready to transmit" signal in the same manner as the authentication message. The photographer, upon receiving the instruction to begin transmitting the images, initiates the image transfer from the camera body 100 to the repository 140 in step 315 by depressing an assigned button on the camera body 100 or selecting a "transmit" menu option. The communication circuit 114 transmits all the images residing on the secure storage 112 to the repository 140 via the established channel therebetween in step 317. The repository 140 receives each image from the camera body 100 and stores the image in a designated directory within a storage system of the repository 140 in step 319. The repository 140 continues with step 319 until an "END" signal is received from the camera body 100, or a predefined time interval elapses since the last data block is received from the camera body 100, i.e. the transfer times out, at step 321. If the "END" signal is received, the repository 140 returns a "safe receipt" signal to the photographer, in the same manner as the authentication message, at step 323. On the other hand, if the transmission times out, the repository 140 returns a "transmission error" signal to the photographer, in the same manner as the authentication message, at step 325.

In an embodiment, the digital image is received along with an associated unique identifier through a secure transmission, the unique identifier associated to the digital image can be any number of symbols or any uniquely identifiable information that can be stored and used to find the specific digital image once it is received. Other information can also be included with the digital image, including time of gathering of the digital image and location of gathering of the digital image. The digital image is received through a secure transmission between the communicating device and the storage device. The secure transmission can occur over a secure bandwidth or a secure channel. In this context, secure is meant to mean, without limitation, that a third party cannot readily access the transmission. The received digital image can also be encrypted prior to being received using any suitable encryption software.

Once the digital image and associated unique identifier have been received, they are stored together on a server as a stored digital image. The server can be any suitable storage device capable of receiving secure transmissions. In an embodiment, the server is accessed through the Internet from a remote location. Alternatively, an authorized operator can only access the server locally in order to retrieve the stored digital image.

During storage the stored digital image can also be synchronously encrypted with another copy of the digital image after a period of time. For example, both the stored digital image and the other copy of the digital image can be encrypted substantially at the same time on a weekly basis or other predefined schedule. This synchronous encryption adds a further layer of security and makes alteration of the stored digital image even more difficult.

The stored digital image can be transmitted to any outside user, including but not limited to a judicial official at a judicial building. The stored digital image can also be transmitted and presented as evidence during a judicial proceeding.

Moreover, the stored digital images may be output to a physical computer-readable medium, such as a CD, DVD, magnetic media, and flash memory devices; or to a hardcopy, such as paper media and transparency media. The computer-readable medium or hardcopy is then placed in an appropriate shipping container and sent to a designated shipping address, e.g. physical address of a judicial proceeding, by bonded courier or other shipping method approved by statute for evidentiary materials.

In the case where physical media is shipped to an address, repository personnel receive a retrieval request including an image data identifier and a shipping address. Repository personnel retrieve image data associated with the image data identifier. The retrieved image data is subsequently transferred to a physical media. Finally, the physical media is shipped to the shipping address.

After transmission, the transmitted copy of the digital image can be compared to the original digital image maintained on the server. This comparison can be used as a confirmation that both the original digital image and the transmitted digital image have not been altered.

Figure 4:
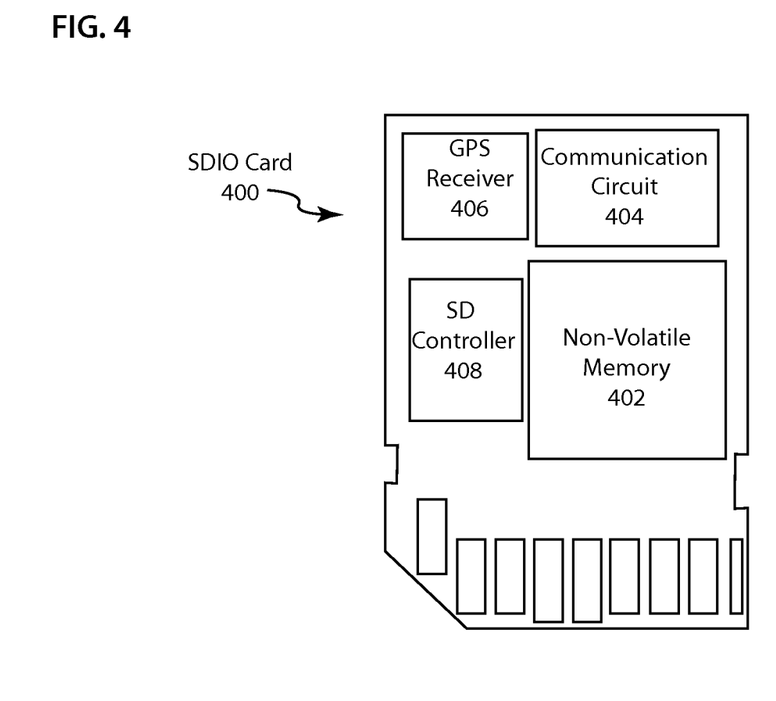
FIG. 4 is a graphical representation of a SDIO card in accordance with an embodiment of the present disclosure.

FIG. 4 shows a block representation of another embodiment of the present disclosure. The present embodiment is implemented as an SDIO card 400. The SDIO card 400 includes a non-volatile memory 402 configured to store digital images thereon. A communication circuit 404 disposed within the SDIO card 400 provides communication between the SDIO card 400 and the repository 140. The communication circuit 404 may communicate via a mobile data communication protocol (i.e., GSM, CDMA, TDMA, WCDMA, LTE, etc.) or wireless protocol such as IEEE 802.11. Moreover, the mobile data communication may be implemented over a satellite link. Furthermore, an embodiment of the present disclosure may include a communication circuit configured to communicate data to a remote site using multiple communication means, such as mobile cellular and satellite. In an embodiment, the communication circuit 404 may be preset to communicate with the repository 140 alone.

A GPS receiver 406 may be included in the SDIO card 400 as well to provide location data. An SD controller 408 controls interaction between the camera body 100 and SDIO card 400, as well as interaction between the various components of the SDIO card 400. In this embodiment, the firmware of the camera body 100 may need to be modified to provide interoperability between the camera body and the SDIO card.

Figure 5:
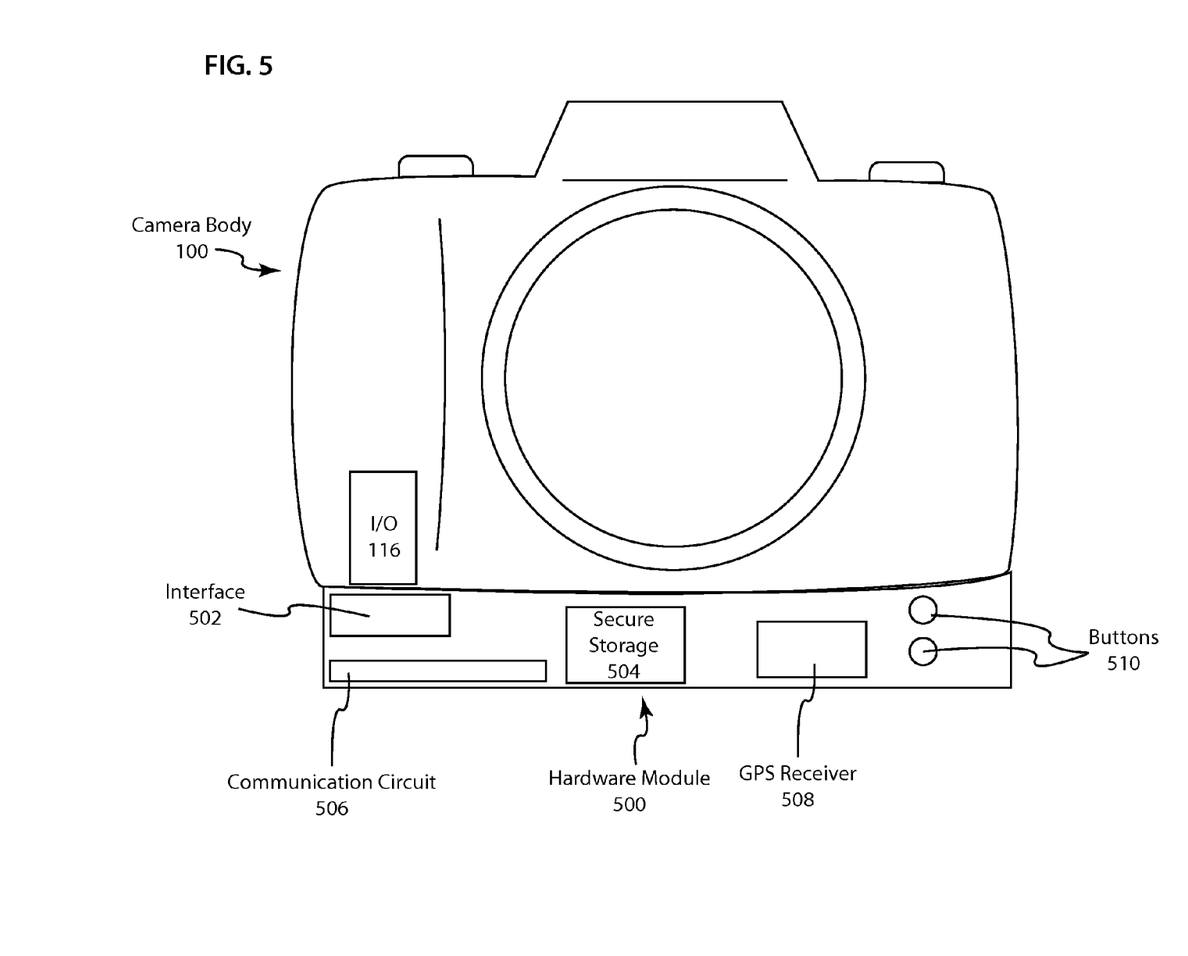
FIG. 5 is a graphical representation of a digital camera having an add-on hardware module in accordance with an embodiment of the present disclosure.

In another embodiment, a hardware module 500, shown in FIG. 5, implements the present disclosure. The hardware module 500 includes an interface 502 configured to electrically couple to an I/O circuit 116 of a camera body 100. The hardware module 500 houses a secure storage device 504, a communication circuit 506 and a GPS receiver 508. Additionally, the hardware module 500 includes buttons 510 configured to perform the functions of requesting to open a communication channel with a repository 140, and starting an image upload process.

The SDIO card embodiment of FIG. 4 is considered as a particular implementation of a hardware module of the present disclosure.

Illustrative Example 1

In this non-limiting example, a real-world walk through of the operation of the image security method will be described.

A company in Texas maintains a number of servers that are able to accept secure transmissions and is not connected to the Internet. The company acts as a third party, neutral storage facility to ensure that digital images received and stored on the servers are not altered in any way between the time they are received and the time they are later transmitted from the facility.

One day, a server within the facility receives an encrypted digital image and an associated unique identifier, ABCDEF, through a secure cellular transmission. Also included with the transmission is the time of day the image was created, 2:05 pm, and the Global Positioning System (GPS) coordinates of the location the image was gathered, 40.736803, −73.616877.

The server stores the encrypted digital image for a length of time. During this storage time, every week, the encrypted digital image is re-encrypted, as another level of security.

After the length of time, in this example until a criminal proceeding against a driver of a vehicle involved in an accident, review of the encrypted digital image is desired. A district attorney wants to review and submit into evidence the encrypted digital image, to prove that the driver was at fault. The Texas server company receives a notification with the unique identifier ABCDEF from the district attorney. An employee in Texas then goes to the server, accesses the server, searches through all the stored images for encrypted digital image ABCDEF and copies the encrypted digital image onto a USB drive. The employee then takes the USB drive to an internet connected computer and transmits the encrypted digital image, the unique identifier, the time of day the image was gathered, 2:05 pm, and the GPS coordinates of the location the image was gathered, 40.736803, −73.616877 for example, directly to a computer in the court room the case is being tried in.

The embodiments shown in FIGS. 1, 2 and 5 are described with respect to a digital single lens reflex (dSLR) camera body, however the present disclosure is applicable to any camera that can be appropriately used for evidence gathering and forensic purposes. Thus, the present disclosure is applicable to dSLR, mirrorless cameras, point-and-shoot cameras, and even cameras provided in mobile devices such as smartphones and tablet computers. Moreover, the present disclosure may be applied to digital video recording devices as well.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A digital camera comprising;
    an image pickup device configured to generate image data;
    a secure storage device configured to receive and store image data from the image pickup device; and
    a communication circuit operably connected to the secure storage device, the communication circuit configured for uni-directional only communication with a secure repository remote from the digital camera, the uni-directional only communication consisting of the transmission of data only from the digital camera to the secure repository, wherein the communication circuit is not configured to receive data from the secure repository, the communication circuit configured to:
        transmit a unique camera identifier of the digital camera to the secure repository, the unique camera identifier configured to authenticate the digital camera to the secure repository as a registered device of the secure depository; and
        transmit the image data stored on the secure storage device to the secure repository.

2. The digital camera of claim 1, wherein the communication circuit communicates with the repository by way of a group consisting of a mobile cellular network, a wireless network and a satellite link.

3. The digital camera of claim 1, further comprising:
a Global Positioning System (GPS) receiver configured to provide coordinates to the digital camera indicating a position of the digital camera at a time at which an image is stored, and
an image processing circuit configured to attach the coordinates to the image.

4. A removable hardware module for a digital camera, the removable hardware module configured to enhance the capabilities of the digital camera, the removable hardware module comprising:
a non-volatile storage device for storing a plurality of images recorded by the digital camera;
an interface configured to form a data communication path between the digital camera and the non-volatile storage device;
a hardware processor configured to receive image data from the digital camera by way of the interface, append identifying information to the received image data; and store the received image data on the non-volatile storage device; and
a communication circuit configured to establish a uni-direction only data transfer path between the non-volatile storage device and a remotely located data repository, the uni- directional only data transfer path configured for the transmission of data only from the non-volatile storage device to the data repository, wherein the uni-direction only data transfer path is not configured to receive data from the secure repository.

5. The removable hardware module of claim 4, wherein the communication circuit communicates with the repository by way of a group consisting of a mobile cellular network, a wireless network and a satellite link.

6. The removable hardware module of claim 4, further comprising:
a Global Positioning System (GPS) receiver, the GPS receiver providing coordinates to the digital camera indicating a position of the hardware module at a time at which an image is stored,
the hardware processor being configured to attach the coordinates to the image.

7. A method implemented by at least one hardware processor of a
secure repository for maintaining authenticity of a digital image, the method comprising:
receiving a request from a digital imaging device to transfer digital image data to the secure repository, the request including a unique identifier of the digital imaging device, the secure repository located remotely from the digital imaging device;
comparing the unique identifier of the digital imaging device to entries in a database maintained by the secure repository to determine whether the digital imaging device is a registered device of the secure depository;
verifying based on the comparison that the digital imaging device is a registered device of the secure repository;
transmitting an authentication request to a computing device of a photographer associated with the digital imaging device in the database of the secure repository, the computing device being a different device than the digital imaging device;
receiving an authentication reply responsive to the transmitted authentication request from the computing device of the photographer, the authentication reply including a passcode;
comparing the received passcode to a passcode associated with the photographer that is stored in the database;
verifying, based the comparison of the received passcode, that the received passcode is associated with the photographer;
transmitting a begin-transmission message to the computing device of the photographer in response to verifying the received passcode;
receiving image data from the digital imaging device; and
storing the received image data at a designated location in a storage system.

8. The method of claim 7, wherein communication between the digital imaging device and the repository occurs on a uni-directional communication channel only, and communication between the repository and the computing device of the photographer occurs on a bi-directional communication channel.

9. The method of claim 8, wherein the computing device of the photographer is a mobile device in possession by the photographer and the mobile device is pre-registered in advance in the repository as being associated with the unique identifier of the digital imaging device.

10. The method of claim 7, further comprising steps for retrieving the received image data stored in the storage system, the steps comprising:
receiving, by repository personnel, a retrieval request including an image data identifier and a shipping address;
retrieving, by repository personnel, image data associated with the image data identifier;
transferring the retrieved image data to a physical media; and
shipping the physical media to the shipping address.

11. The method of claim 7, further comprising:
sending a confirmation message to the device different from the digital imaging device in response to receiving the image data from the digital imaging device.

12. The method of claim 11, wherein the confirmation message comprises a number of image data received, file name for each image data received, identifier associated with the digital imaging device and time of receipt.

13. The method of claim 7, wherein the image data from the digital imaging device is encrypted.

14. The method of claim 7, wherein an image data identifier is associated with each stored image data, the image data identifier being unique for each image data.

15. The method of claim 7, further comprising:
storing a copy of the received image in the storage system; and
synchronously encrypting the stored received image data and the stored copy of the received image periodically according to a pre-defined schedule.

16. The method of claim 15, wherein synchronously encrypting the stored received image data and the stored copy of the received image periodically according to a pre-defined schedule comprises synchronously encrypting the stored received image data and the stored copy of the received image on a weekly basis.

17. A digital image recording apparatus comprising;
an image pickup device configured to generate image data;
a secure storage device configured to receive and store image data from the image pickup device; and
a communication circuit operably connected to the secure storage device, the communication circuit configured to transmit the image data to a repository remote from the digital image recording apparatus and accessible by a pre-stored communication identifier, the communication circuit configured for uni-directional only communication with the repository, the uni-directional only communication consisting of the transmission of data only from the digital image recording device to the repository, wherein the communication circuit is not configured to receive data from the repository.

18. The digital image recording apparatus of claim 17, wherein the image pickup device generates motion image data and the digital image recording device is a video recording apparatus.

19. The digital image recording apparatus of claim 17, wherein the communication circuit communicates with the repository by way of a group consisting of a mobile cellular network, a wireless network and a satellite link.

20. The digital image recording apparatus of claim 17, further comprising:
   a Global Positioning System (GPS) receiver configured to provide coordinates to the digital image recording apparatus indicating a position of the digital image recording apparatus at a time at which an image is stored, and
   an image processing circuit configured to attach the coordinates to the image.

* * * * *